April 13, 1937. P. SCHEWE 2,077,018
APPARATUS FOR CUTTING AND ELEVATING GRAIN
Filed May 6, 1935
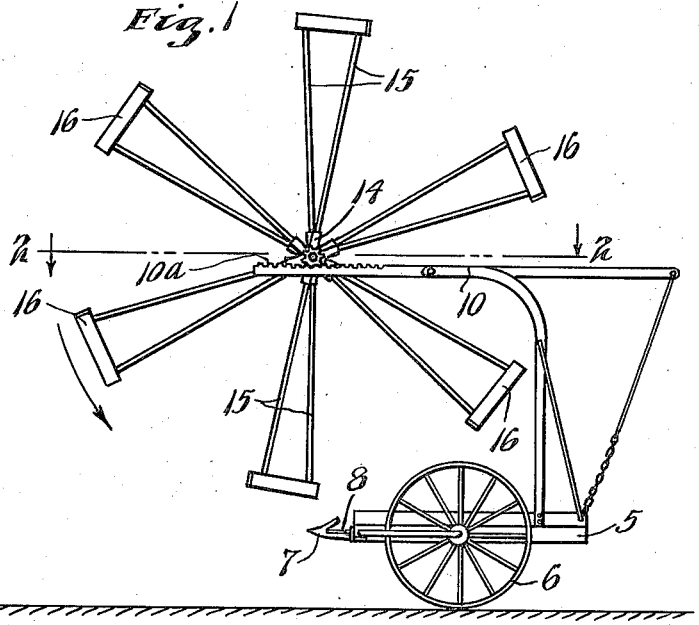
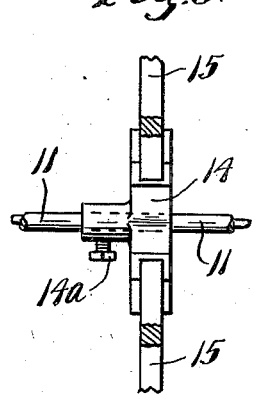
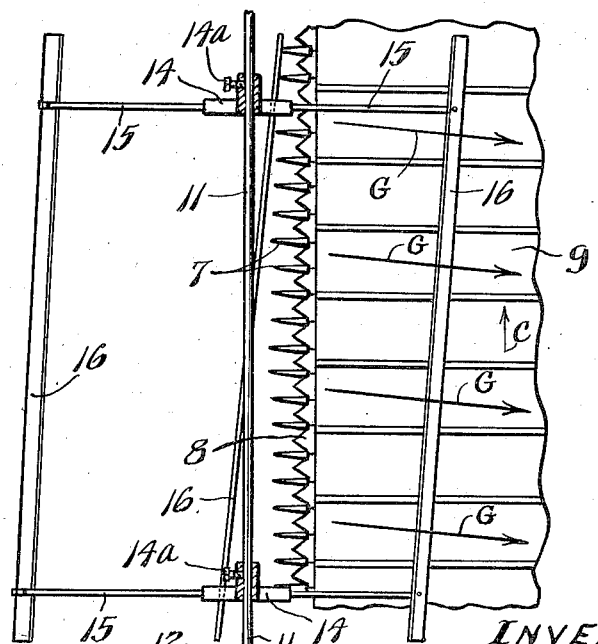
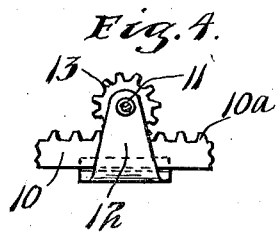
INVENTOR.
PAUL SCHEWE.
BY HIS ATTORNEYS.
Williamson & Williamson Patented Apr. 13, 1937

2,077,018

UNITED STATES PATENT OFFICE 2,077,018

APPARATUS FOR CUTTING AND ELEVATING GRAIN

Paul Schewe, Fairfax, Minn.

Application May 6, 1935, Serial No. 19,983

1 Claim. (Cl. 56—220)

My invention relates to agricultural implements and particularly to the construction and method of using the reels of grain binders and the like.

In operation of a grain binder having a reel of conventional design the slats of the reel propel the heads and upper part of the grain in a directly rearward direction for the intended purpose of laying the grain on the conveyor in positions extending transversely thereacross with the heads toward the rear. However, the heads of the grain are deposited on the conveyor before the butt ends of the grain are completely severed by and free of the sickle with the result that movement of the conveyor carries the heads of the grain ahead of the butt ends and the grain lies on the conveyor in a skewed position and is so delivered to the binding or bundling part of the machine. The bundles formed are accordingly poorly shaped and less compact than they should be.

A general object of my invention is to provide improvements in the reels of grain binders whereby stalks of grain will be placed on the conveyors of such grain binders in positions extending in a direction at right angles to the direction of movement of the conveyor.

A more specific object is to provide an improved reel for grain binders which will impart not only rearward movement to the heads of grain being acted upon, but also a component of movement in a direction opposite to the direction of movement of the conveyors of such grain binders.

These and other objects and advantages of the invention will be more fully set forth in the following description made in connection with the accompanying drawing, in which like reference characters refer to similar parts throughout the several views, and in which:—

Fig. 1 is a side view of a portion of a grain binder incorporating my improved reel;

Fig. 2 is a broken away horizontal sectional view taken along the line 2—2 of Fig. 1 as indicated by the arrows;

Fig. 3 is a detail view of one of the hubs of my reel, and

Fig. 4 is a detail of one of the bearings associated with my reel.

Referring to the drawing, my improved reel is shown incorporated in a conventional form of grain binder including a platform 5 partially supported by a grain wheel 6, a sickle having guards 7 and a knife 8 disposed immediately forward of and parallel to the front edge of the platform 5, a conveyor 9 mounted on the platform 5 to receive grain cut by the sickle and deliver such grain to the binding or bundling mechanism (not shown) of the machine, a reel supporting frame 10 and a reel pipe or shaft 11 journaled in suitable bearings carried by the frame 10 and arranged to be rotated by suitable means (not shown). The conveyor 9 is driven by suitable means (not shown) in the direction indicated by the arrow C in Fig. 2. The reel pipe or shaft 11 has a counterclockwise direction of rotation as viewed in Fig. 1.

The reel supporting frame 10 is toothed in portions to form upwardly facing racks 10a. Members 12, in which the reel pipe 11 is journaled are mounted on the racks 10 for longitudinal sliding movement relative thereto. Normally stationary gears 13 are rotatably mounted on the respective members 12 and are meshed with the respective racks 10a. Rotation of the gears 13 results in movement of the members 12 along the racks 10a to adjustively move the reel pipe 11 forwardly or rearwardly with respect to the sickle.

All of the structure described above is of conventional form and operates in a well known manner. The inventive features of my improved reel construction will be described.

A pair of reel hubs 14 are mounted on the reel shaft 11 adjacent the respective ends thereof. The hubs 14 are mounted on the shaft 11 for angular displacement thereon and are releasably secured against such displacement by set-screws 14a.

Spokes or arms 15 are mounted at their inner ends on each of the hubs 14 and extend radially outwardly therefrom. Reel slats 16 are provided each of which is secured at one of its ends to the outer end of an arm 15 associated with one of the hubs 14 and at the other of its ends to the outer end of a corresponding one of the arms 15 associated with the remaining one of the hubs 14. The reel comprising the hubs 14, arms 15 and slats 16 rotates in a counterclockwise direction as viewed in Fig. 1 and as indicated by the larger arrow of Fig. 1.

The one of the hubs 14 nearest the delivery end of the conveyor 9 is set on the reel shaft 11, in a position angularly displaced in the direction of rotation of the reel with respect to the remaining one of the hubs 14 so as to skew each of the slats 16 with respect to a line parallel to the rotational axis of the reel. The direction of skew is such that the rearwardly moving slat 16 at the lowermost portion of the reel faces in a diagonal direction having a rearward principal component and a smaller component opposite in direction to the direction of movement of the conveyor 9.

The degree of skew may be readily adjusted by loosening the set-screw 14a of one of the hubs 14, suitably angularly displacing that hub and again tightening the set-screw 14a.

In operation of my improved reel the rearwardly traveling lowermost slat 16 thereof imparts to the heads and upper portions of grain stalks not only rearward movement but also a component of movement opposite in direction to the movement of the conveyor 9 as is indicated by the large arrows in Fig. 2.

This results in the grain stalk being deposited on the conveyor in a diagonal position wherein the head of the grain is disposed a substantial distance farther away from the delivery end of the conveyor than the butt end of the grain. While severing of the butt end of the grain stalk is being completed the conveyor 9 is progressing the head end of the stalk through the substantial distance mentioned and when the butt end finally becomes free of the sickle and starts to move with the conveyor 9 the head end of the grain has just completed its movement through said substantial distance and the grain stalk is disposed transversely of the conveyor at right angles to the direction of movement thereof. Each stalk of grain delivered to the conveyor will assume the transverse position described and all of the grain will be delivered by the conveyor to the binding or bundling mechanism in such position. Grain so delivered to the binding mechanism will be bound thereby into more compact and better formed bundles than can be produced by grain binders having a reel of conventional type.

To obtain accurate placement of grain on the conveyor in the transverse position previously described and to adjust the machine for handling grain of different types the degree of skew of the reel slats 16 is suitably changed by varying the angular displacement of one of the hubs 14 relative to the other on the reel shaft.

It will, of course, be understood that various changes may be made in the form, details, proportions and arrangement of the parts, without departing from the scope of my invention, which generally stated, consists in a device capable of carrying out the objects above set forth, and in the novel parts and combinations of parts disclosed and defined in the appended claim.

What is claimed is:—

In a grain binder having a sickle and a horizontal conveyor at the rear of said sickle, a reel structure above said sickle comprising a reel shaft, a pair of hubs mounted on said shaft adjacent respective ends thereof, radial slat supporting arms mounted on each of said hubs, a series of slats, each slat being attached at its respective ends to corresponding arms of said hubs, the one of said hubs adjacent the delivery end of said conveyor and the arms carried thereby being angularly advanced in the direction of rotation of said reel relative to the other hub and the arms carried thereby so as to skew each of said slats relative to lines parallel to the axis of said shaft whereby said reel will impart a component of movement to the heads of grain acted upon thereby in a direction opposite to the direction of movement of said conveyor, and releasable means securing one of said hubs against rotation on said shaft whereby said hub may be set in various positions on said shaft to set said slats to various degrees of skew.

PAUL SCHEWE.